United States Patent
Nucci et al.

(10) Patent No.: US 11,356,342 B2
(45) Date of Patent: Jun. 7, 2022

(54) METHODS AND APPARATUS FOR OPTIMIZING BANDWIDTH CONSUMPTION IN SUPPORT OF INTENSE NETWORK-WISE HEALTH ASSESSMENT

(71) Applicant: Cisco Technology, Inc., San Jose, CA (US)

(72) Inventors: Antonio Nucci, San Jose, CA (US); Jaykishan Anilkumar Pandya, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/744,950

(22) Filed: Jan. 16, 2020

(65) Prior Publication Data
US 2021/0226863 A1 Jul. 22, 2021

(51) Int. Cl.
| | | |
|---|---|---|
| *H04L 41/022* | (2022.01) | |
| *H04L 41/0233* | (2022.01) | |
| *H04L 41/085* | (2022.01) | |
| *H04L 43/028* | (2022.01) | |
| *H04L 43/065* | (2022.01) | |
| *H04L 41/044* | (2022.01) | |

(52) U.S. Cl.
CPC .......... *H04L 43/028* (2013.01); *H04L 41/022* (2013.01); *H04L 41/0233* (2013.01); *H04L 41/044* (2013.01); *H04L 41/085* (2013.01); *H04L 43/065* (2013.01)

(58) Field of Classification Search
CPC . H04L 43/028; H04L 41/044; H04L 41/0233; H04L 43/065; H04L 41/022
See application file for complete search history.

(56) References Cited

U.S. PATENT DOCUMENTS

| | | | |
|---|---|---|---|
| 10,341,748 B2 | 7/2019 | Anand et al. | |
| 2016/0087851 A1* | 3/2016 | Hugenberg, III | ... H04L 41/0853 709/224 |
| 2016/0224329 A1* | 8/2016 | Whitney | ................... G06F 8/71 |
| 2016/0234087 A1 | 8/2016 | Nyerges et al. | |
| 2018/0367428 A1 | 12/2018 | Di Pietro et al. | |
| 2019/0013954 A1 | 1/2019 | Anand et al. | |
| 2019/0014036 A1 | 1/2019 | Anand et al. | |
| 2019/0014395 A1 | 1/2019 | Anand et al. | |
| 2019/0149440 A1 | 5/2019 | Rantzau et al. | |

OTHER PUBLICATIONS

AIOps Platform for Network Professionals, Network Traffic Analysis, retrieved on Sep. 27, 2019 at «https://www.kentik.com/product/kentik-platform/», Kentik, 5 pgs.

* cited by examiner

*Primary Examiner* — Shirley X Zhang
(74) *Attorney, Agent, or Firm* — Lee & Hayes, P.C.

(57) ABSTRACT

This disclosure describes techniques for providing a network diagnostic system with on-premise node processing and cloud node processing to optimize bandwidth usage and decrease memory footprint. The on-premise node may receive streaming telemetry from connected network devices and encode to the telemetry data into filtered data objects. The on-premise node may determine whether the state of a network device has changed to determine to push the filtered data object to a cloud node for further diagnostic analysis. The cloud node may include a gateway and a pool of proxy servers, wherein each proxy server is designated to perform diagnostic analysis on a single product type.

20 Claims, 6 Drawing Sheets

METHODS AND APPARATUS FOR OPTIMIZING BANDWIDTH CONSUMPTION IN SUPPORT OF INTENSE NETWORK-WISE HEALTH ASSESSMENT

TECHNICAL FIELD

The present disclosure relates generally to providing a network diagnostic system designed to cope with the challenges of high data rates with streaming push modality and massive data pipeline analysis.

BACKGROUND

Previous generation of network systems saw the rise of enterprise networks over its predecessor, the single location data centers, to serve an organization's operational needs. In response to the increasing number of network devices (e.g., routers, hubs, switches, etc.) connected throughout the organization, network management systems need a standardized way to remotely monitor and manage these devices. For over 30 years, network management systems use Simple Network Management Protocol (SNMP) as the industry standard to collect telemetry information for network devices.

While SNMP was able to provide the needed protocol for collecting and organizing data for managed devices on Internet Protocol (IP) networks, SNMP uses pull technology which has multiple shortcomings for networks that are growing at exponential rate. These include its antiquated 'pull' model, polling frequency challenges, and the overhead that more polling adds to the network. For instance, with modern enterprise networks, the network management system monitoring the network devices is typically an external information technology (IT) system of an IT vendor. The data pulling request is sent by the IT diagnostic system to the devices regularly at predefined intervals and devices responds back by sending their status. The time between two consecutive pulling requests can range from 5 to 60 minutes during which the status of the network is completely unknown to IT systems. Thus, administrators end up with time gaps, or network blindness, in the information gathered. As networks grow every day, the likelihood of something going wrong during network blindness increases exponentially which translates to decrease network uptime.

These data pulling interactions between the network devices and the external management system are high bandwidth interactions. Additionally, as the number of connected devices grow over time, the bandwidth required to manage these interactions similarly grow. To alleviate the high-bandwidth consumption problem, the IT vendors may increase the pulling periods to 24 hours, which further prolongs the network blindness problem mention before. Moreover, the pull method requires the external IT vendor to initiate interaction by polling every connected device for every customer, which creates a bottle neck at the IT vendor and creates scalability issues.

With networks becoming more hyper-connected and more heterogeneous (multi-vendor network devices) every day, SNMP cannot keep up with the speed and scale required with next generation networks. Thus, next generation networks are adopting the novel data push model (e.g. streaming telemetry) over traditional data pull SNMP. Streaming telemetry is a data push mechanism that solves the SNMP problem by enabling every network device to push information out only when needed based on a set of pre-configured rules active on the network device. Device rules can be as simple as pushing device data out every predetermined time interval (e.g., every 60 seconds, every 5 minutes, etc.) to the management system or can be more sophisticated with the settings of conditional thresholds on device metrics relevant to network management applications that when crossed would trigger the pushing out of specific data (e.g., CPU utilization, memory usage, power consumption, etc.). Streaming telemetry enables network management system to operate with the ability to select the specific data the device should push and the specific frequency.

While the benefits of data push models are tangible from a network management point of view, streaming telemetry can still be very bandwidth and processing intensive for network management tasks like the network-wise health diagnostic. Due to industry-wise adoption of streaming telemetry and cloud-based network management services—IT vendors are now called to address new problems. Determining how to effectively process an unprecedented massive amount of network diagnostic data from their customers without choking the bandwidth between customer on-premise and cloud and how to execute diagnostic analysis in the cloud across their large portfolio of managed customers to rapidly detect a problem and deploy a fix to guarantee a high network uptime to their customers. For a large IT vendor, which may support tens of thousands of customers worldwide, this translates into over 18 EB (Exabytes) of diagnostic data arriving at the cloud gateway for diagnostic analysis every 60 seconds. Accordingly, it may be advantageous to design an end-to-end network diagnostic system able to grow and scale with the challenges of next generation networks—networks that are even more hyper-connected and heterogeneous with continuous device increase and are generating even more data.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
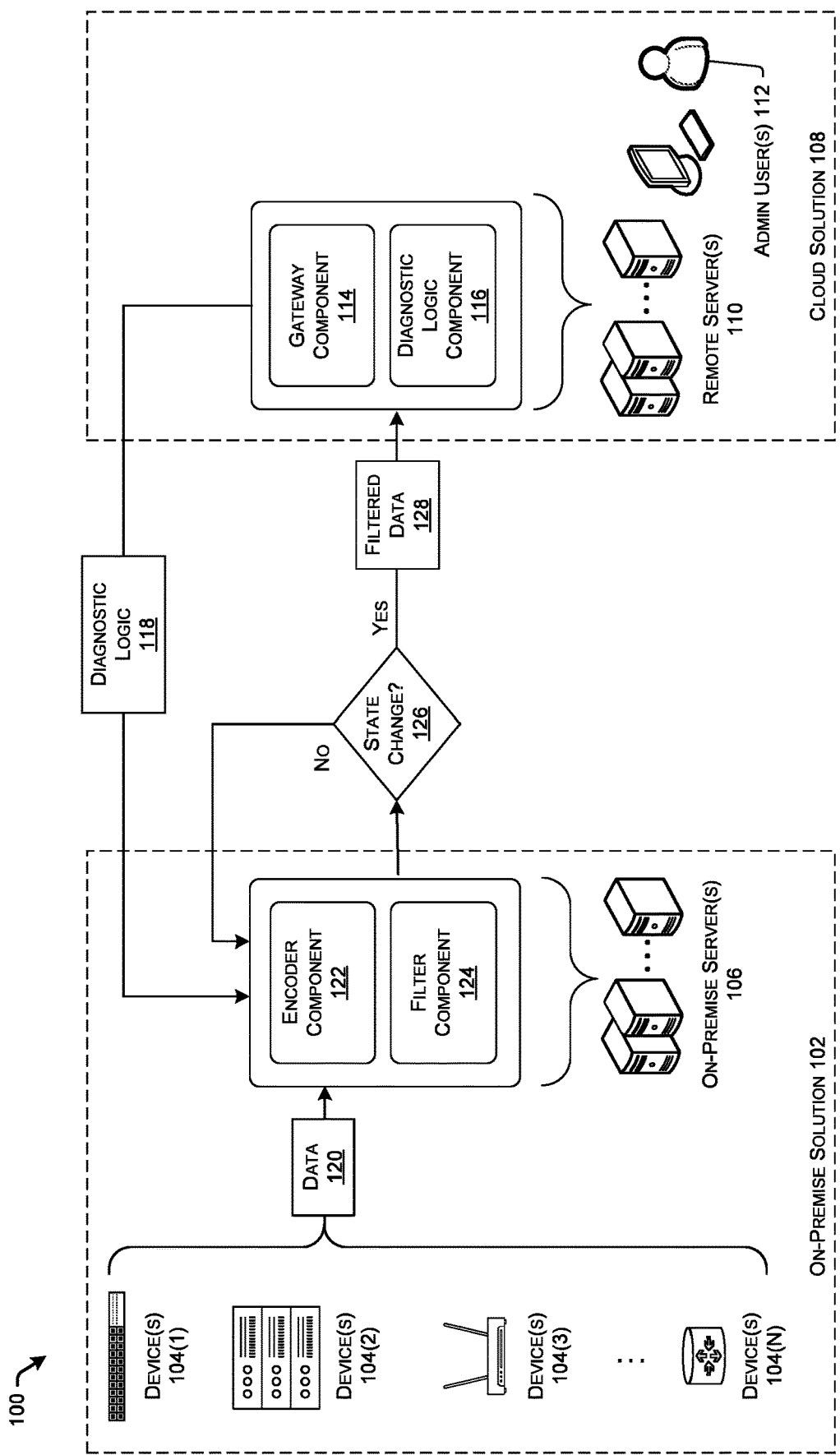
FIG. 1 illustrates a system-architecture diagram of an example environment in which a network diagnostic system uses two logical nodes, an on-premise node and a cloud node, to process diagnostic data from network devices.

This disclosure describes techniques for providing a network-diagnostic system with two logical nodes, on-premise and cloud, to intelligently determine when to push filtered data to the cloud. The method includes configuring diagnostic logic to process data at the cloud node and distributing the diagnostic logic to on-premise nodes. The method further includes pushing streaming telemetry from connected network devices to the on-premise node at a predetermined time interval (e.g., 60 seconds). The on-premise node may apply the diagnostic logic to the streaming telemetry to filter out irrelevant information then hash the filtered data for efficient storage. The method includes determining if a device state of a network device has changed. If the device state has changed, the filtered data object is pushed to the cloud node. Further, the method includes a two-tier cloud architecture including a gateway to forward data objects and a pool of proxy servers to process data objects, with each proxy server configured to execute diagnostic analysis on data objects for a specific product type.

Additionally, the techniques described herein may be performed by a system and/or device having non-transitory computer-readable media storing computer-executable instructions that, when executed by one or more processors, performs the method described above.

Example Embodiments

The usefulness of streaming telemetry in network management systems, from the popularity of cloud-based managed services and adoption of streaming telemetry, has resulted in greater need for network diagnostic systems with capability of optimizing bandwidth usage while reducing memory footprint. To reduce the costly bandwidth interaction of sending all telemetry data from all network devices connected to the enterprise network to the cloud, the present system includes two logic nodes, on-premise and cloud, for data processing. By leveraging two nodes for processing, the system is able to collect, process, and analyze large volumes of diagnostic data objects every 60 seconds. In a typical enterprise network, thousands of network devices are connected but only a small fraction of these connected devices needs to be closely analyzed. The present network diagnostic system performs a preliminary analysis for state changes on each device at the on-premise node, if a state change is detected, then the system pushes the metadata to the cloud for a thorough analysis.

In some examples, this drastic reduction in network blindness, starts with creating a custom diagnostic logic for each product family. An administrator (e.g., subject matter expert) may configure device diagnostic logic to perform diagnostic analysis on metadata generated by the device to evaluate it for threat. The list of relevant parameters can be generated from the custom diagnostic logic created by the administrators. In some instances, the device diagnostic logic may include rules to remove irrelevant information that doesn't indicate threat activity (e.g., current timestamp, coder's comments, general product description, etc.). Because the different network devices have different configurations and sensors, each product family may have its own device diagnostic logic to analyze data specific to a device of a product type. The cloud servers may distribute the device diagnostic logic to customers having one or more devices of the product type on their enterprise network.

At the enterprise network level, the on-premise node receives the diagnostic logic. The on-premise node, also referred to as the enterprise network or local network, handles diagnostic data objects from connected network devices. The network device generates metadata, also referred to as a diagnostic data object, streaming telemetry, telemetry data, or a data object, has device specific information along with the sensor(s) statistics. In some examples, the on-premise node handles the collection of raw device streaming telemetry from every device deployed in the network every predetermined time interval (e.g., 60 seconds) and execute the diagnostic logic to rapidly extract device information which is relevant for diagnostic analysis. The on-premise node may execute a checker to assess whether there is any change in the relevant data compared to the previous collection window, and if so, push the diagnostic data object to the cloud for further diagnostic analysis. If no change is detected, the system avoids sending the data object to the cloud, thus saving network bandwidth and cloud processing.

The cloud node, also referred herein as the remote servers, cloud servers, or cloud, performs a deeper level of analysis on the data objects to assess it for actual threat rather than a simple state change. The cloud node includes functionality to serve as a gateway to receive the data object and forward the data object to a specific proxy based on product type of the network device that generated the data object. An individual proxy server of the pool of proxy servers handles a queue of diagnostic data objects specific to a product type to enable faster processing.

Although the techniques described herein are primarily with reference to network diagnostic systems, the techniques are generally applicable to any proactive diagnostic and/or large deployment of connected devices techniques, including Internet-of-Things (IoT) systems, security systems, fleet of autonomous vehicle systems, and the like. Further, while some the techniques are described with reference to a physical server (e.g., remote server(s)), the techniques are equally applicable to any virtual servers that is deployed on top of a cluster of physical servers.

The techniques described herein provide various improvements and efficiencies with respect to network diagnostic system. For example, the techniques described herein may reduce the time gaps and/or network blindness for the network diagnostic system to process diagnostic data objects for network health assessment by using the two logical nodes to distribute diagnostic tasks and remove the cloud-only analysis bottleneck. The system implements an on-premise node with an encoder to process the collected device streaming telemetry and extract only the information which is relevant to diagnostic analytics. The encoder drastically reduces the amount of information to be processed. The on-premise node also implements a data filter that performs hash functions on the device diagnostic data to optimize the memory footprint and CPU utilization for writing/reading diagnostic data on-premise. Moreover, the on-premise node may determine whether a device state change is detected based on the hashed and filtered data object. If no change is detected, the on-premise node avoids sending the data object to the cloud hence saving network bandwidth and the cloud node will have one less irrelevant task to process. Furthermore, the cloud network uses a two-tiered architecture including a gateway and a pool of processing proxy servers to further optimize data flow. The individual proxy servers are configured to use single diagnostic logic to process diagnostic data for a product family rather than general network devices to further improve the efficiency for data processing. Accordingly, the system reduces bandwidth usage and improves the efficiencies of data processing.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a network diagnostic system uses two logical nodes, an on-premise node and a cloud node, to process diagnostic data from network devices, as described herein.

In some examples, the example environment 100 for a network diagnostic system may utilize the on-premise solution 102 and the cloud solution 108 to optimize bandwidth consumption in collecting, processing, and analyzing the diagnostic data objects from the network devices.

The on-premise solution 102 may include the device(s) 104(1)-104(N), where N is any integer greater than "1," and the on-premise server(s) 106. In some instances, the devices 104 and the on-premise server(s) 106 may be part of an enterprise network and may be distributed in different data centers located across geographic areas. The on-premise server(s) 106 can communicate with the devices 104 and/or the remote server(s) 110 via one or more network(s).

The devices 104 may include, but is not limited to, any combination of: routers, switches, Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), any other data traffic control entity configured to communicate and/or route data packets between host devices, the devices 104, the on-premise server(s) 106, the remote server(s) 110, and/or the network(s), and the like. A device of the devices 104 may belong to a product family and may be identified by a product type and a device identifier. The devices 104 may include any number of sensor(s) that may or may not be enabled to generate telemetry data. In some embodiments, the devices 104 may be operated by the customer and/or the IT vendor. The devices 104 (referred herein as connected devices, network devices, deployed devices, and the like) may include any devices deployed by and/or managed by the IT vendor.

In some examples, the devices 104 may generate diagnostic data (e.g., data 120), also referred herein as diagnostic data objects and/or metadata. The data 120 may include device specific information along with the sensor(s) telemetry data. In some examples, the data information can include variant and invariant information. Not all variant information is relevant for device diagnostic purpose (e.g. comments, description, timestamps, etc.). The list of relevant parameters can be generated from custom diagnostic logic created by the admin user(s) 112, as described herein. In some examples, the data 120 may include the device configuration data including information about the device such as active features, IP address, routing information, and the like. In some examples, the devices 104 may be configured to push the data 120 to the on-premise server(s) 106 every predetermined time interval (e.g., 60 seconds).

The on-premise server(s) 106 and the remote server(s) 110 may include, but is not limited to, any combination of: computing devices, servers, cluster of servers, virtual machines, virtual servers, and the like. In some examples, the network diagnostic system may include distributed systems and may utilize software clustering where multiple physical servers are turned into a cluster of physical servers, or a group of servers, that act like a single system. Each of the servers in the physical cluster collectively run, to function as a group, or support the same distributed system.

In some examples, the on-premise solution 102 may be a part of an enterprise network through which a customer may manage a part of the network for general operations (e.g., creating user accounts, providing network access for employees, etc.), while an IT vendor may provide network services and help the customer manage the networking devices (e.g., devices 104). The IT vendor may provide cloud-based network management services (e.g., cloud solution 108) to help minimize the footprint of on-premise hardware needed for network management.

The cloud solution 108 may include the remote server(s) 110. In various examples, the cloud solution 108 may include one or more admin user(s) 112, employed by the IT vendor, to provide support for the cloud solution 108 and/or the on-premise solution 102. The cloud solution 108 may include a two-tier cloud architecture, the first tier serving as a gateway and the second tier serving as a pool of diagnostic proxies. In some examples, the cloud solution 108 may also configure the first tier as master and the second tier as slave, wherein data traffic will always flow from a master server to a slave server (e.g., data objects move from a master-gateway to a slave-proxy) and not the other way around. In additional examples, the cloud solution 108 may also configure a dedicated proxy server for each product type that the IT vendor supports. The dedicated proxy server is custom configured as per the diagnostic logic because the amount of metadata and processing required in diagnostic logic is different across product type.

The admin user(s) 112 may include administrators, support personnel, analysts, subject matter experts, and the like. In some examples, the admin user(s) 112 may configure device rules for a network device to push out specific diagnosis data. As described herein, the devices 104 may generate metadata including information that can be irrelevant for device diagnostic purpose (e.g., comments, description, timestamps, etc.). The admin user(s) 112 can create custom diagnostic logic to generate a list of relevant parameters for each product type added. The admin user(s) 112 may update the diagnostic logic as they learn about new vulnerabilities. The admin user(s) 112 may update the diagnostic logic to include new diagnostic rule or diagnostic relevant information to be used by the on-premise business logic. In some examples, the admin user(s) 112 may view notifications of alerts pertaining to devices 104 analyzed as under possible threat and make decisions regarding appropriate responses to the alerts.

The remote server(s) 110 may include a gateway component 114 and a diagnostic logic component 116. As described herein, the remote server(s) 110 may be configured with functionality to serve as any part of a two-tier cloud solution, with the first tier serving as a gateway and the second tier serving as a diagnostic proxy. The remote server(s) 110 can communicate with the on-premise server(s) 106 via one or more network.

The gateway component 114 may include functionality to receive and forward diagnostic objects. In some examples, the gateway component 114 may receive a diagnostic object and may determine the product type of the device that originated the diagnostic data. The gateway component 114 may forward the diagnostic data to a product specific proxy server from a pool of special proxies based on the product type of the device that originated the diagnostic data. In some instances, each product specific proxy server may include a queue to hold data objects belonging to a single specific product type. In the present example, the gateway component 114 may distribute the data objects across multiple queues.

The diagnostic logic component 116 may include functionality to perform diagnostic analysis on a queue of diagnostic objects. In some examples, the diagnostic logic component 116 may be configured with a specific device diagnostic logic to perform diagnostic analysis on diagnostic objects belonging to single product type. In the present example, the diagnostic logic component 116 may be configured with a diagnostic logic for a product type that the present server is dedicated to. The diagnostic logic component 116 execution of the diagnostic analysis on a single product type queue is faster since the logic is lighter.

In some examples, the remote server(s) 110 may keep track of which device types (e.g., product families, product types, device unique identifiers, etc.) are deployed to which customer and may determine when a new diagnostic rule or diagnostic relevant information is available and should be deployed to an on-premise server(s) 106. In various examples, the list of relevant information and/or parameters can be generated from the custom diagnostic logic (e.g., diagnostic logic 118) created by the admin user(s) 112.

The diagnostic logic 118 is a live document, which gets updated by the admin user(s) 112 from time to time. As the new bugs are identified and new features are introduced, the admin user(s) 112 will assess the risk and update the diagnostic logic 118. For instance, updates to the diagnostic logic may increase in the beginning when new bug is identified. The diagnostic logic also varies as the knowledge of the bug changes over time. As the product ages and the potential bugs are fixed, the product becomes stable and the diagnostic logic does not change often.

As can be understood, the diagnostic logic 118 can change for any product type at any time because new software bugs, security vulnerabilities, field notices are regularly discovered and published. Accordingly, when a new entry of diagnostic logic for a particular product type is added into the cloud system, the cloud has to dispatch the new information to all on-premise customers having at least one device of the particular product type. In response to receiving the new diagnostic logic, the on-premise server(s) 106 should trigger a new diagnostic analysis on any relevant devices by tagging the device state as changed.

The on-premise server(s) 106 may include the encoder component 122 and the filter component 124. The on-premise server(s) 106 may receive the diagnostic logic 118 from the remote server(s) 110 to process data objects received from the devices 104 and to determine whether to send the data object to the cloud for further analysis based on the device state.

The on-premise server(s) 106 may track the health of every device 104 over time by using a light 2-states Markov Chain model for each device. A device state of "state-0" represents no changes detected between a current collection time (t) and a previous collection time, (e.g., (t−60) for a 60 seconds push interval). A device state of "state-1" represents changed state implying that the device state has changed during the last two time–windows (t, t−60), which requires further diagnostic analysis for the device. In additional examples, when the on-premise server(s) 106 receives a new diagnostic logic 118, all connected device associated with the same product type is tagged with the device state of "state-1." The Markov Chain model starts at state-0 indicating no changes detected and remains in state-0 if no new diagnostic logic and no changes in metadata is detect. However, if either a new diagnostic logic or change in metadata is detected, then the state of the device is state-1.

The encoder component 122 may receive and process raw device data by applying the diagnostic logic 118, as described herein. The encoder component 122 may receive raw data from the devices 104. In some examples, the encoder component 122 may apply the diagnostic logic 118 to filter out irrelevant data and/or extract relevant data to generate filtered data.

The filter component 124 may include functionality to compress and store the metadata for comparison to determine a device state change. As described herein, a change in the device metadata between two consecutive time windows indicates that the state of the device has been changed. Due to the large number of devices monitored in an enterprise network and the large volume of metadata to be stored per device, the filter component 124 may further compress the metadata for storage.

In some instances, the filter component 124 may apply a Bloom filter model to hash and store the metadata. As described herein, the filter component 124 may identify the device diagnostic data which has changed over two consecutive time periods and hash such information using a customized version of Bloom filter arrays for storage. If the relevant information shows no change compared to the previous window, then the device state is tagged as no change (e.g., state-0) implying that there is no need to push its newly connected diagnostic data object to the cloud for diagnostic analysis; conversely, if the relevant information has changed between the two windows, the device is tagged as changed (e.g., state-1) and would require a new run of cloud diagnostic analysis.

As can be understood, the filter component 124 can apply any other additional and/or alternative compression and/or hashing algorithm to process and/or store the data objects more efficiently.

As a non-limiting example, in an example network diagnostic system with an on-premise node and a cloud node, an admin user(s) 112 may interact with the system via the remote servers(s) 110 to update the example diagnostic logic 118 for an example device belonging to the product family of "Product Type 1." The system may determine that a customer has at least one device of the particular product type—"Product Type 1" and sends the updated diagnostic logic 118 to the on-premise server(s) 106 of that customer.

In the present non-limiting example, at the on-premise node, the on-premise server(s) 106 may receive the updated diagnostic logic 118. The devices 104 may push example diagnostic data 120 to the on-premise server(s) 106 every 60 seconds. The encoder component 122 can process the example diagnostic data 120 by applying the corresponding diagnostic logic include the diagnostic logic 118. The diagnostic logic may include diagnostic rules to filter out irrelevant information from the example diagnostic data 120 to generate filtered data. In the present example, if an example device 104(5) and an example device 104(8) belong the product family of "Product Type 1," the system may determine that the device state for the example device 104(5) and the example device 104(8) should be set to changed ("state-1") to trigger further data analysis. In additional examples, the filter component 124 may process the filtered data and determine that an example configuration data for an example device 104(6) has changed over two consecutive time periods, and may tag the device state for the example device 104(6) as changed. In response to the example state change check 126 for each of the devices 104, the system may affirm the device state change for at least the example device 104(5), the example device 104(6), and the example device 104(8). Accordingly, the on-premise server(s) 106 may push the example filtered data 128 associated with the example device 104(5), the example device 104(6), and the example device 104(8) to the cloud for further diagnostic analysis.

Figure 2:
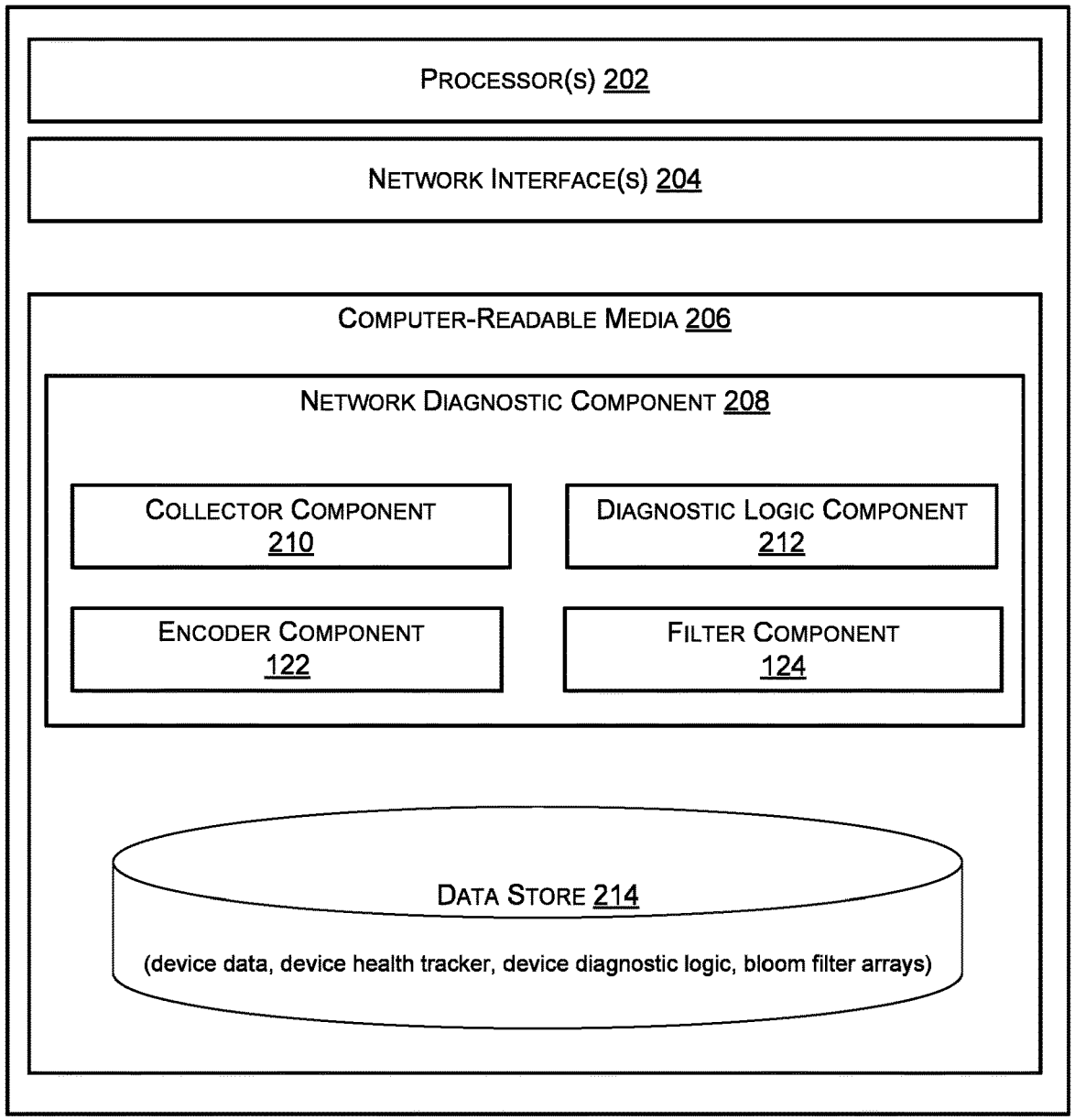
FIG. 2 is a block diagram of an illustrative computing architecture for implementing an on-premise server that can be utilized to implement aspects of the various technologies presented herein.
Figure 3:
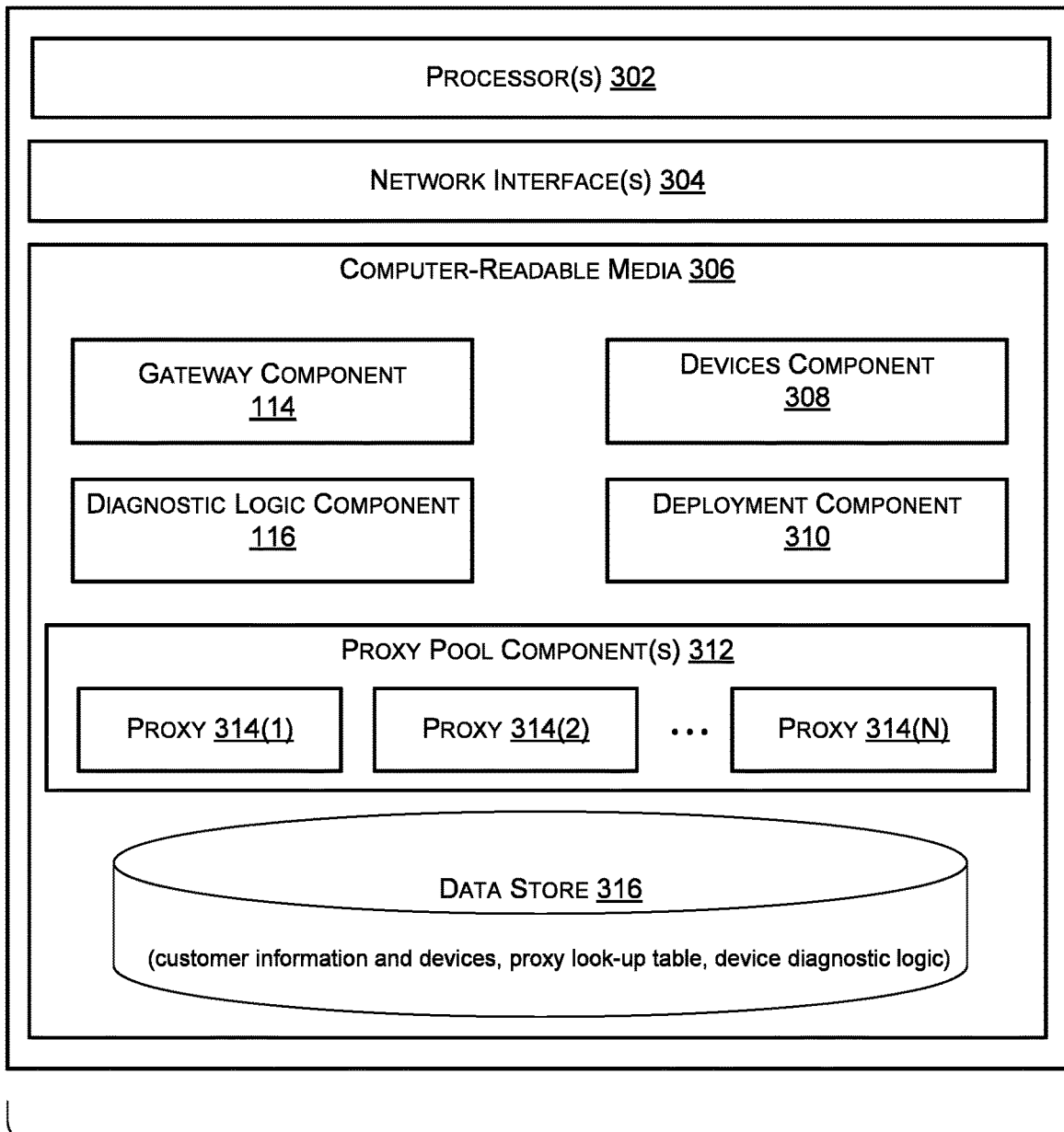
FIG. 3 is a block diagram of an illustrative computing architecture for implementing a remote server that can be utilized to implement aspects of the various technologies presented herein.

FIGS. 2 and 3 are block diagrams of an illustrative computing architecture 200 of the on-premise server(s) 106 and an illustrative computing architecture 300 of the remote server(s) 110. The computing architecture 200 and the computing architecture 300 may each be implemented in a distributed or non-distributed computing environment.

The computing architecture 200 and 300 may include one or more processor(s) 202 and 302, one or more network interfaces 204 and 304, and one or more computer-readable media 206 and 306 that stores various modules, data structures, applications, programs, or other data. As illustrated, the computing architecture 200 and 300 may include one or more hardware processors 202 and 302 (processors) configured to execute one or more stored instructions. The processor(s) 202 and 302 may comprise one or more cores. Further, the computing architecture 200 and computing architecture 300 may include one or more network interfaces 204 and 304 configured to provide communications between the on-premise server(s) 106, the remote server(s) 110, and other devices, and communications between devices in the on-premise solution 102 (e.g., devices 104) and cloud solution 108. The network interfaces 204 and 304 may include devices configured to couple to personal area networks (PANs), wired and wireless local area networks (LANs), wired and wireless wide area networks (WANs), and so forth. For example, the network interfaces 204 and 304 may include devices compatible with Ethernet, Wi-Fi™, and so forth. The computer-readable media 206 and 306 may include instructions that, when executed by the one or more processor(s) 202 and 302, cause the processors to perform the operations described herein for the on-premise server(s) 106 and the remote server(s) 110.

The computer-readable media 206 and 306 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media appropriate for storing electronic instructions. In addition, in some embodiments, the computer-readable media 206 and 306 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

The computing architecture 200 may include computer-readable media 206. In some embodiments, the computer-readable media 206 may store the network diagnostic component 208 and associated components, and the data store 214, which are described in turn. The components may be stored together or in a distributed arrangement. In some examples, the on-premise server(s) 106 may include all or some components of the network diagnostic component 208. In additional examples, the on-premise server(s) 106 may include all or some components of the computing architecture 200 as different physical and/or virtual servers.

The network diagnostic component 208 may include the collector component 210, the diagnostic logic component 212, the encoder component 122, and the filter component 124.

In some examples, the network diagnostic component 208 may track the health of every deployed device in the network over time by using a light 2-states Markov Chain model for each device. As described herein, the device state of "state-0" represents no changes detected between a current collection time (t) and a previous collection time, (e.g., (t−60) for a 60 seconds push interval). A device state of "state-1" represents changed state implying that the device state has changed during the last two time-windows (t, t−60), which requires further diagnostic analysis for the device. The network diagnostic component 208 may determine the device state has changed if the filter component 124 determines the metadata for a particular device has changed during the last two time-windows or if the diagnostic logic component 212 has received an updated diagnostic logic for a product type associated with the particular device.

The collector component 210 may include functionality to receive streaming telemetry from connected devices. In some examples, the connected devices may push diagnostic data to the on-premise server(s) 106 at every predetermined time interval (e.g., 60 seconds, 5 minutes, 1 hour, etc.). The collector component 210 may receive the data for processing. In some examples, the collector component 210 may verify the data objects are generated by devices managed by the IT vendor.

The diagnostic logic component 212 may implement functionality to perform diagnostic analysis on diagnostic objects. In some examples, the diagnostic logic component 212 may receive new and/or updated diagnostic logic from the cloud server. In additional examples, the diagnostic logic component 212 may determine which diagnostic logic to apply to a data object based at least in part on the product type of the device that generated the data object.

The encoder component 122 may receive and process raw device data by applying the diagnostic logic 118, as described herein. The encoder component 122 may receive raw data from the devices 104. In some examples, the encoder component 122 may apply the diagnostic logic 118 to filter out irrelevant data and/or extract relevant data to generate filtered data.

The filter component 124 may include functionality to compress and store the metadata for comparison to determine a device state change, as described herein. The change in the device metadata between two consecutive time windows indicates that the state of the device has been changed. To check whether the metadata is changed, the filter component 124 stores the previous metadata information. However, due to the large number of devices monitored in an enterprise network and the large volume of metadata to be stored per device, the filter component 124 may further compress the metadata for storage. The filter component 124 may compare the current metadata relative to the stored previous metadata information to determine if a change is detected, if so, then the state of the device has been changed.

In some instances, the filter component 124 may apply a Bloom filter model to compress and store the metadata. A Bloom filter is a probabilistic data structure and is used to test whether an element is a member of a set. As a "probabilistic" data structure, false positive matches are possible using the Bloom filter, but false negatives are not. Accordingly, the filter component 124 has some small probability of incorrectly pushing metadata for a network device with unchanged state. However, this small probability remains more efficient than pushing every data object to the cloud network.

The filter component 124 may include functionality to use custom Bloom filter arrays to store hashed metadata for every device deployed in the network. To store data for the two consecutive time windows, the custom Bloom filter arrays may include at least: previous_array, current_array, and empty_array. Wherein:
- previous_array=m number of bits, time $[t_0-60 \text{ s}, t_0)$
- current_array=m number of bits, time $[t_0, t_0+60 \text{ s})$
- empty_array=m number of 0 bits At every predetermined time interval, or 60 seconds in the present example, the filter component 124 will set the arrays as:
- previous_array=current_array
- current_array=empty_array
- empty_array=reset(previous_array)

By initializing the three arrays then swapping memory address at the predetermined time interval and resetting the bits to 0 for the empty_array, the memory for the arrays does not have to be reallocated.

As discussed herein, the present approach has room for false positive error, but it can be controlled by changing the size of array (m) and number of hash function (k).

False Positive Probability $$P = \left(1 - \left[1 - \frac{1}{m}\right]^{kn}\right)^k$$

$$\text{size } m = -\frac{n \ln P}{(\ln 2)^2}$$

\# hash function count $$k = \frac{m}{n} \ln 2$$

where n=number of elements (e.g., number of network devices)

As a general example of Bloom filter application, a Bloom filter consists of an array of m number of bits (m Boolean values), initially all bits are set to 0 (false), as well as 'k' independent hash functions, h0, h1, . . . h(k−1) each within range of {0, 1, 2, . . . , m−1}. Data objects may be added into the Bloom filter. When a data object has to be added to the array, the data object is hashed with 'k' hash functions and 'm' array positions are obtained (k number of hash values), and the bits in those indexes are changed to from 0 to 1. To perform a search( ) for the existence of a data object in the array, the data object is hashed with 'k' hash functions (to obtain k number of hash values), then the bit values at the array positions (corresponding to the k number of hash values) are checked, and if the bit value is 1 (true) at all its array positions, the search( ) for the existence of the data object is returned 1 (true).

Applying the Bloom filter to a device state check, if the current metadata is found in the array storing the previous set of metadata, then the device state has not changed.

In an example, assuming an existing network device is being monitored (thus the system stored a previous_array of hashed metadata for the network), the filter component 124 applies the Bloom filter to an incoming data object as follows:
- receive metadata
- apply k number of non-cryptographic hash functions on the metadata
- receive k number of hash values from the applying k number of hash functions
- perform insert( ) in the current_array of $[t_0, t_0+60 \text{ s})$ timeframe
- perform search( ) in the previous_array of $[t_0-60 \text{ s}, t_0)$ timeframe
- determine whether all k number of hash values are present in the previous_array
- if present, then device state="state-0," thus indicating no change detected on the device based on comparing metadata
- if not present, then device state="state-1," thus indicating change has been detected on the device based on comparing metadata In the present example, because the network devices generate and push metadata every 60 seconds, the filter component 124 needs to process the metadata in 60 seconds before updated metadata arrives and before resetting the arrays. In various examples, if the filter component 124 determines that the system unable to process the queue of metadata from all the network devices within the 60 seconds time interval, it may generate an alert for an analyst to increase the predetermined time interval or check for issues within the processing system.

As a non-limiting example, the filter component 124 may apply the present Bloom filter to an example typical medium-size enterprise network comprised of an average of 35,000 connected and managed devices and 30 sensors are activated on each device. Every 60 seconds, 1 million (35,000 devices*30 sensors/device) records will be generated. The predetermined threshold probability for false positives is set to 10e-5 (1 in 10,000).

The size of the Bloom array and the number of hash functions using above mentioned equations is calculated as:
- size of Bloom array m=2,104,5410 (2.51 MB)
- \# hash function count k=8

Thus, the present example enterprise network will need 3 Bloom filter arrays of 2,104,5410 (2.51 MB) and 8 hash functions to process the metadata. The memory requirement is nominal compare to the caching approach, wherein the memory requirement to store only one snapshot of the example medium-size enterprise network (35,000 devices) is 18 Tb, which is not a practical solution to implement at on-premise (customer) side.

The operations insert( ) and search( ) will take same amount of time O(k). In both cases, the filter component 124 needs to run the input through all of the hash functions and check the output bits in the array. Here time complexity does not depend on the number of elements in it. This is because the metadata is never entered in the table, only their hashes.

As described herein, the network diagnostic component 208 may determine a device state has changed if the filter component 124 determines the metadata for a particular device has changed during the last two time-windows or if the diagnostic logic component 212 has received an updated diagnostic logic for a product type associated with the particular device. In response to determining that the particular device has a device state of "state-1," the network diagnostic component 208 may push the filtered metadata generated by the particular device to the cloud server for further diagnostic analysis.

The on-premise solution 102 may include a data store 214 that is stored on an on-premise server(s) 106 of the on-premise solution 102, or across multiple on-premise server(s) 106 of the on-premise solution 102. The data store 214 may include a file store that includes one or more images may comprise static files that include executable code to run an isolated process, such as diagnostic tools, virtual machine image, etc. The images may comprise system libraries, system tools, and other platform settings a software program needs to run on a virtualized platform.

The data store 214 may further store device data, such as the number of network devices and identifiers, the device health data, the device diagnostic logic, and Bloom filter array data. The individual network device data may comprise various types of data indicating specific information of the devices. The device diagnostic logic may indicate a corresponding product type that the logic should be applied to. The Bloom filter array data may include any number of arrays generated to store the metadata for every device on the network.

As shown in FIG. 3, in some configurations, the computer-readable media 306 may store the gateway component 114, the devices component 308, the diagnostic logic component 116, the deployment component 310, the proxy pool component(s) 312 and associated components, and the data store 316, which are described in turn. The components may be stored together or in a distributed arrangement. In additional examples, the remote server(s) 110 may include all or some components of the computing architecture 300 as different physical and/or virtual servers.

The gateway component 114 may include functionality to receive and forward diagnostic data objects. In some examples, the gateway component 114 may receive filtered diagnostic data objects from the on-premise server(s) 106 through to the one or more network, as described herein. The gateway component 114 may determine which product type the incoming diagnostic data object is associated with. In some examples, the gateway component 114 may use a look-up table based on the product type to determine the proxy server that is dedicated to processing data objects for the product type and forward the data object to the proxy server. In various examples, if more than one proxy servers are dedicated to processing a particular product family, the gateway component 114 may use any load balancing scheme to distribute the data objects between the more than one proxy servers (e.g., round robin).

The devices component 308 may include functionality to track all deployed devices. The devices component 308 may keep track of which device types (e.g., product families, product types, device unique identifiers, etc.) are deployed to which customer and may determine when a new diagnostic logic or diagnostic relevant information is available and should be deployed to an on-premise server. The devices component 308 may include functionality to perform reverse lookup for the customer based on a data object received. For instance, if the devices component 308 receive a data object, it may determine which device generated the data object, and which customer the device belongs to.

The diagnostic logic component 116 may include functionality to perform diagnostic analysis on a queue of diagnostic objects. In some examples, the diagnostic logic component 116 may be configured with a particular diagnostic logic to perform diagnostic analysis on a queue of diagnostic objects for the particular product type. The diagnostic logic component 116 execution of the diagnostic analysis on a per-queue is faster since the logic is lighter.

In some examples, the diagnostic logic component 116 may implement functionality to notify the customer of any new threat identified and/or detected.

The deployment component 310 may push software updates, diagnostic logic, and the like, to customers. When a new diagnostic logic is added for a product family of a particular product type, the deployment component 310 may interact with the devices component 308 to identify the customers having at least one device associated with the particular product type and may transmit the new diagnostic logic to the appropriate on-site server(s).

The proxy pool component(s) 312 may implement functionality to configure a server to act as a custom build proxy server for a particular product type. The custom build proxy server 314(1) will be configured in such way to optimize the performance to process the metadata for one product type. In some examples, the proxy pool component(s) 312 may monitor the processing queue for each proxy server in the proxy pool. In some instances, the proxy pool component(s) 312 may determine to add additional custom build proxy server for the popular product types which has high installation base for the customers. The high installation based may be determined based on the number of deployed devices belonging to a particular product type exceeding a deployment threshold. As described herein, the diagnostic logic for each product type may vary greatly and may result in much faster or slower diagnosis time. Accordingly, in some instances, the proxy pool component(s) 312 may determine to add additional custom build proxy server based on long processing queue. In some examples, the proxy pool component(s) 312 may determine to change a custom build proxy server for a previously popular product types, which is being phased out due to aging, to a different product type.

The cloud solution 108 may include a data store 316 that is stored on a remote server(s) 110 of the cloud solution 108, or across multiple remote server(s) 110 of the cloud solution 108. The data store 316 may include a file store that includes one or more images may comprise static files that include executable code to run an isolated process, such as proxy server image, virtual machine image, mapping table image, etc. The images may comprise system libraries, system tools, and other platform settings a software program needs to run on a virtualized platform.

The data store 316 may further store device data, such as the product family, product type, and identifiers, the individual customer data, the proxy mapping table, and device diagnostic logic. The individual customer data may comprise various types of data indicating information about the customer and locations of the devices. The proxy mapping table may indicate which proxy server is dedicated to which product type.

Figure 4:
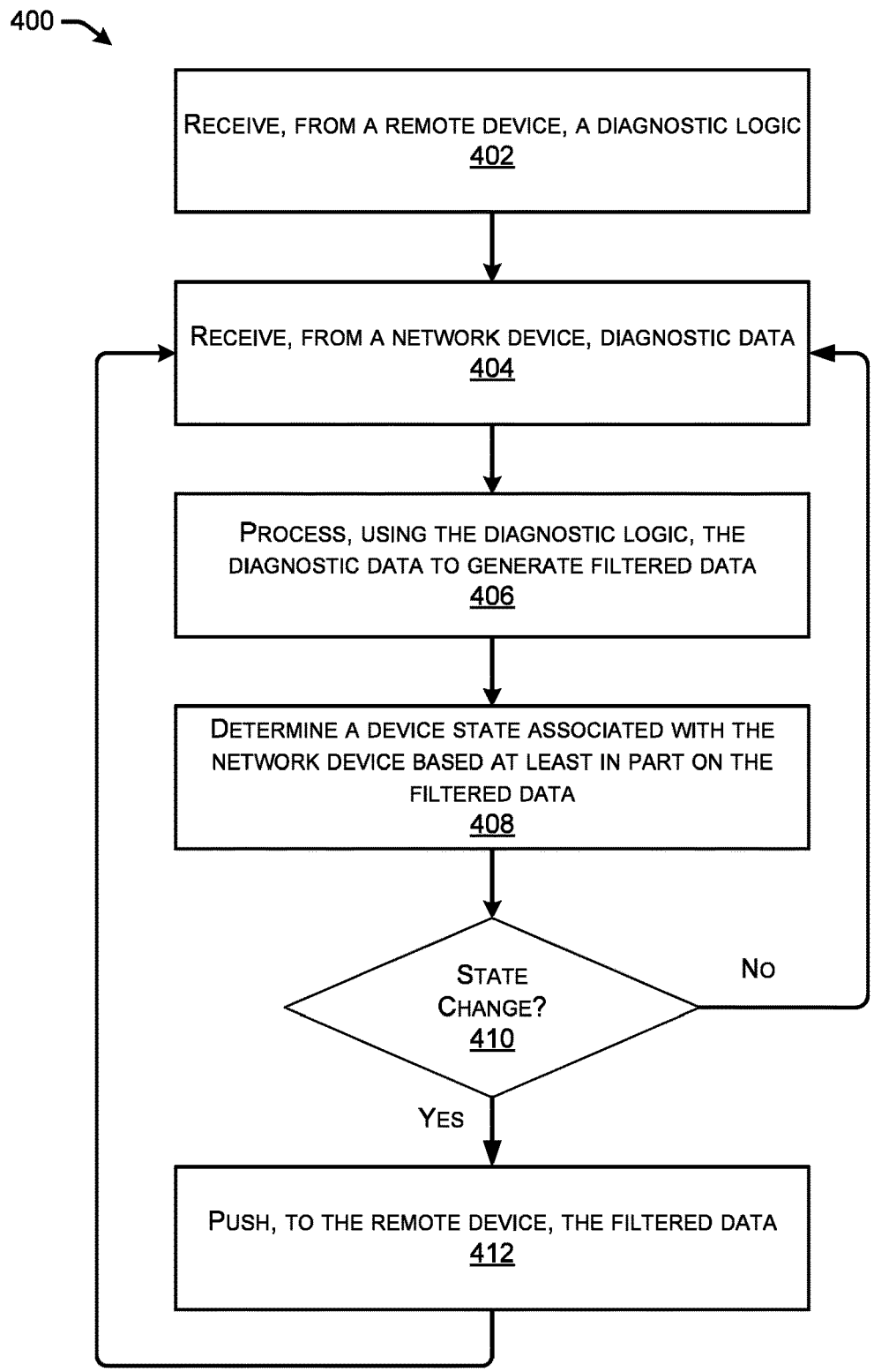
FIG. 4 illustrates a flow diagram of an example method for collecting and encoding diagnostic data objects from a network device.
Figure 5:
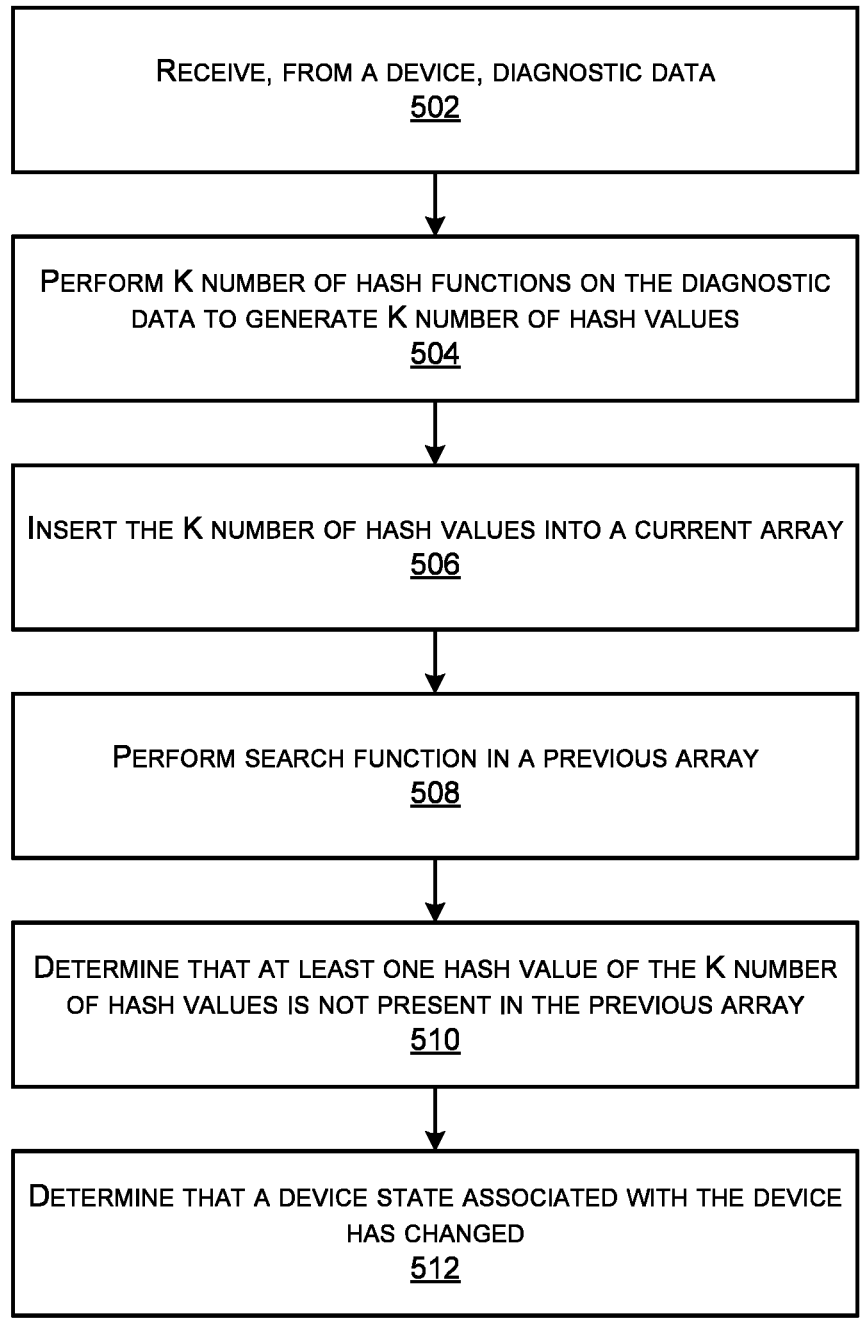
FIG. 5 illustrates a flow diagram of an example method for processing diagnostic data objects from a network device.
Figure 6:
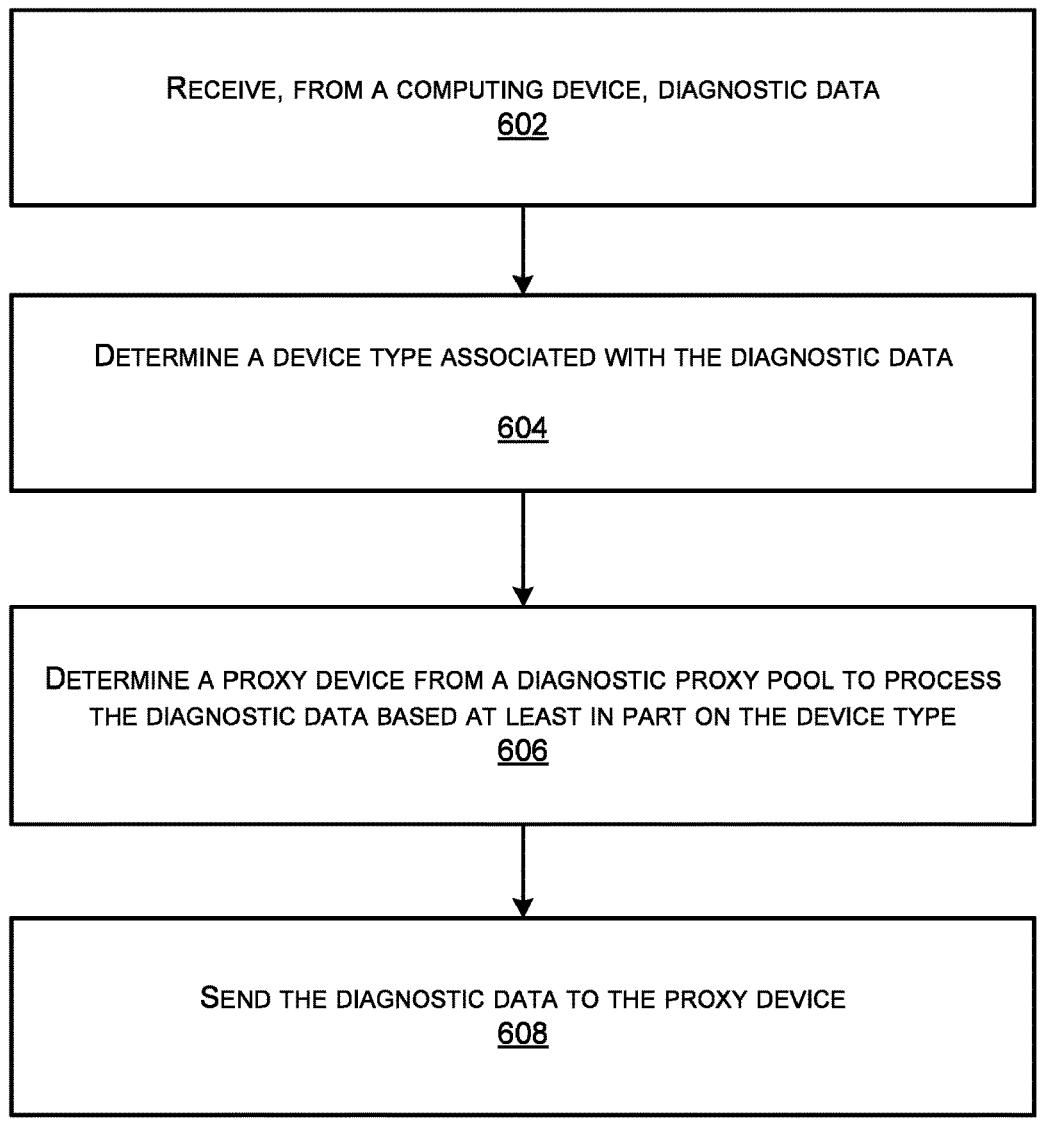
FIG. 6 illustrates a flow diagram of an example method for handling diagnostic data objects received for diagnostic analysis.

FIGS. 4, 5, and 6 illustrate flow diagrams of example methods 400, 500, and 600 that illustrate aspects of the functions performed at least partly by the on-premise solution 102 and the cloud solution 108 as described in FIGS. 1-3. The logical operations described herein with respect to FIGS. 4, 5, and 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4, 5, and 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 illustrates a flow diagram of an example method 400 for collecting and encoding diagnostic data objects from a network device. The method 400 is described with reference to the on-premise solution 102 and may be performed by the on-premise server(s) 106 and/or in cooperation with any one or more of the devices 104, or the remote server(s) 110. Of course, the method 400 may be performed in other similar and/or different environments.

At 402, the diagnostic logic component 212 may receive, from a remote device, a diagnostic logic. In some examples, the diagnostic logic component 212 may receive new and updated diagnostic logic from the cloud server.

At 404, the collector component 210 may receive, from a network device, diagnostic data. The collector component 210 may include functionality to receive streaming telemetry from network devices. In some examples, the network devices may push diagnostic data to the on-premise server(s) 106 at every predetermined time interval (e.g., 60 seconds, 5 minutes, 1 hour, etc.). The collector component 210 may receive the data for processing. In some examples, the collector component 210 may verify the data objects are generated by devices managed by the IT vendor.

At 406, the encoder component 122 may process, using the diagnostic logic, the diagnostic data to generate filtered data. The encoder component 122 may receive and process raw device data by applying the diagnostic logic 118, as described herein. The encoder component 122 may receive raw data from the devices 104. In some examples, the encoder component 122 may apply the diagnostic logic 118 to filter out irrelevant data and/or extract relevant data to generate filtered data.

At 408, the filter component 124 may include functionality to compress and store the metadata for comparison to determine a device state change, as described herein. The change in the device metadata between two consecutive time windows indicates that the state of the device has been changed. To check whether the metadata is changed, the filter component 124 stores the previous metadata information. However, due to the large number of devices monitored in an enterprise network and the large volume of metadata to be stored per device, the filter component 124 may further compress the metadata for storage. The filter component 124 may compare the current metadata relative to the stored previous metadata information to determine if a change is detected, if so, then the state of the device has been changed.

At 410, the network diagnostic component 208 may determine next operation based on whether the device state changed. The network diagnostic component 208 may track the health of every deployed device in the network over time by using a light 2-states Markov Chain model for each device. As described herein, the device state of "state-0" represents no changes detected between a current collection time (t) and a previous collection time, (e.g., (t−60) for a 60 seconds push interval). A device state of "state-1" represents changed state implying that the device state has changed during the last two time-windows (t, t−60), which requires further diagnostic analysis for the device. The network diagnostic component 208 may determine the device state has changed if the filter component 124 determines the metadata for a particular device has changed during the last two time-windows or if the diagnostic logic component 212 has received an updated diagnostic logic for a product type associated with the particular device. If the device state has not changed, the system is done processing the current diagnostic data object and repeats this process to analyze the next diagnostic data object. If the state of the device has changed, then the data should be pushed to the cloud.

At 412, the network diagnostic component 208 may push, to the remote device, the filtered data. In response to determining that the particular device has a device state of "state-1," the network diagnostic component 208 may push the filtered metadata generated by the particular device to the cloud server for further diagnostic analysis.

FIG. 5 illustrates a flow diagram of an example method 500 for filtering diagnostic data objects from a network device. The method 500 is described with reference to the on-premise solution 102 and may be performed by the on-premise server(s) 106 and/or in cooperation with any one or more of the devices 104, or the remote server(s) 110. Of course, the method 500 may be performed in other similar and/or different environments.

At 502, the collector component 210 may receive, from a device, diagnostic data. The collector component 210 may include functionality to receive streaming telemetry from connected devices. In some examples, the connected devices may push diagnostic data to the on-premise server(s) 106 at every predetermined time interval (e.g., 60 seconds). The collector component 210 may receive the data for processing. In some examples, the collector component 210 may verify the data objects are generated by devices managed by the IT vendor.

At 504, the filter component 124 may perform k number of hash functions on the diagnostic data to generate k number of hash values. In some instances, the filter component 124 may apply a Bloom filter model to compress and store the metadata, as described herein. A Bloom filter is a probabilistic data structure and is used to test whether an element is a member of a set. The filter component 124 may include functionality to initialize custom Bloom filter arrays to store compressed metadata for every device deployed in the network. To store data for the two consecutive time windows, the custom Bloom filter arrays may include at least: previous_array, current_array, and empty_array. Wherein:

previous_array=m number of bits, time [$t_0$−60 s, $t_0$)
current_array=m number of bits, time [$t_0$, $t_0$+60 s)
empty_array=m number of 0 bits At every predetermined time interval, or 60 seconds in the present example, the filter component 124 will reset the arrays as:

previous_array=current_array
current_array=empty_array empty_array=reset(previous_array)

The Bloom filter may apply k number of non-cryptographic hash functions on the metadata.

At 506, the filter component 124 may insert the k number of hash values into a current array. In some instances, the filter component 124 may apply a Bloom filter model to compress and store the metadata, as described herein. The Bloom filter model may perform insert( ) in the current array of [$t_0$, $t_0$+60 s) timeframe.

At 508, the filter component 124 may perform search function in a previous array. In some instances, the filter component 124 may apply a Bloom filter model to compress and store the metadata, as described herein. The Bloom filter model may perform search( ) in the previous_array of [$t_0$−60 s, $t_0$) timeframe.

At 510, the filter component 124 may determine that at least one hash value of the k number of hash values is not present in the previous array. In some instances, the filter component 124 may apply a Bloom filter model to compress and store the metadata, as described herein. The Bloom filter model may determine whether all k number of hash values is present in the previous_array. If even one of the k number of hash values is not present, then then the metadata has changed and the device state has changed.

At 512, the filter component 124 may determine that a device state associated with the device has changed. In some instances, the filter component 124 may apply a Bloom filter model to compress and store the metadata, as described herein. The Bloom filter model may determine whether all k number of hash values is present in the previous_array. If not present, then device state="state-1," thus indicating change has been detected on the device based on comparing metadata.

FIG. 6 illustrates a flow diagram of an example method 600 performing threat analysis on diagnostic data objects. The method 600 is described with reference to the cloud solution 108 and may be performed by the remote server(s) 110 and/or in cooperation with any one or more of the on-premise server(s) 106 or the devices 104. Of course, the method 600 may be performed in other similar and/or different environments.

At 602, the gateway component 114 may receive, from a computing device, diagnostic data. The gateway component 114 may include functionality receive and forward diagnostic data objects. In some examples, the gateway component 114 may receive filtered diagnostic data objects from the on-premise server(s) 106 through to the one or more network, as described herein.

At 604, the devices component 308 may determine a device type associated with the diagnostic data. The devices component 308 may include functionality to track all deployed devices. The devices component 308 may keep track of which device types (e.g., product families, product types, device unique identifiers, etc.) are deployed to which customer and may determine when a new diagnostic logic or diagnostic relevant information is available and should be deployed to an on-premise server. The devices component 308 may include functionality to perform reverse lookup for the customer based on a data object received. For instance, if the devices component 308 receive a data object, it may determine which device generated the data object, and which customer the device belongs to.

At 606, the gateway component 114 may determine a proxy device from a diagnostic proxy pool to process the diagnostic data based at least in part on the device type. In some examples, the gateway component 114 may use a look-up table based on the product type to determine the proxy server that is dedicated to processing data objects for the product type and forward the data object to the proxy server. In various examples, if more than one proxy server is dedicated to processing a particular product family, the gateway component 114 may use any load balancing scheme to distribute the data objects between the proxy servers (e.g., round robin).

At 608, the gateway component 114 may send the diagnostic data to the proxy device. The gateway component 114 may forward the data object to the proxy server. In various examples, if more than one proxy server is dedicated to processing a particular product family, the gateway component 114 may use any load balancing scheme to distribute the data objects between the proxy servers (e.g., round robin).

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:

one or more processors; and one or more non-transitory computer-readable media storing computer-executable instructions that, when executed by the one or more processors, cause the one or more processors to:

receive, from a remote server, a device diagnostic logic including diagnostic rules for processing diagnostic data from devices associated with a product type;

receive, from a network device, a first diagnostic data object associated with a first timestamp;

process, using the device diagnostic logic, the first diagnostic data object to generate a first filtered data object;

determine an array size for Bloom filter arrays based at least in part on a count of managed network devices and a predetermined threshold probability for false positives;

generate the Bloom filter arrays of the array size to store hashed metadata, wherein the Bloom filter arrays includes a previous array and a current array, wherein the hash metadata includes hashed filtered data objects;

perform a predetermined number of hash functions on the first filtered data object to generate a first predetermined number of hash values, wherein the predetermined number of hash functions to perform is based at least in part on the array size and the count of managed network devices;

insert the first filtered data object in the current array using the first predetermined number of hash values;

receive, from the network device, a second diagnostic data object associated with a second timestamp;

process, using the device diagnostic logic, the second diagnostic data object to generate a second filtered data object;

perform the predetermined number of hash functions on the second filtered data object to generate a second predetermined number of hash values;

perform a search in the previous array using the second predetermined number of hash values;

determine that a device state of the network device is unchanged based at least in part on the search in the previous array returning true; and refrain from sending the second filtered data object based at least in part on the device state is unchanged.

2. The system of claim 1, wherein processing the first diagnostic data object further comprises:
determine that the device state of the network device is changed based at least in part on receiving the device diagnostic logic; and
send, to the remote server, the first filtered data object.

3. The system of claim 1, wherein the diagnostic rules includes identifying relevant information in diagnostic data.

4. The system of claim 1, wherein applying the device diagnostic logic to the first diagnostic data object includes determining that the network device is associated with the product type.

5. The system of claim 1, further comprising computer-executable instructions that, when executed by the one or more processors, cause the one or more processors to:
receive, from the network device, a third diagnostic data object associated with a third timestamp;
process, using the device diagnostic logic, the third diagnostic data object to generate a third filtered data object;
determine that the device state of the network device is changed based at least in part on comparing the third filtered data object with respect to the second filtered data object; and
send, to the remote server, the third filtered data object.

6. A method comprising:
receiving, from a network device, a first diagnostic data object;
processing the first diagnostic data object using a device diagnostic logic to generate a first filtered data object;
determining an array size for Bloom filter arrays based at least in part on a count of managed network devices and a predetermined threshold probability for false positives;
generating the Bloom filter arrays of the array size to store hashed filtered data objects, wherein the Bloom filter arrays includes a previous array and a current array;
performing a predetermined number of hash functions on the first filtered data object to generate a first predetermined number of hash values, wherein the predetermined number of hash functions to perform is based at least in part on the array size and the count of managed network devices;
inserting the first filtered data object in the current array using the first predetermined number of hash values;
receiving, from the network device, a second diagnostic data object;
processing the second diagnostic data object using the device diagnostic logic to generate a second filtered data object;
performing the predetermined number of hash functions on the second filtered data object to generate a second predetermined number of hash values;
performing a search in the previous array using the second predetermined number of hash values; and
determining a device state of the network device based at least in part on a result of the search in the previous array.

7. The method of claim 6, further comprising:
determining that the device state of the network device is changed based at least in part on the search returning false; and
sending, to a remote server, the second filtered data object.

8. The method of claim 6, wherein the device diagnostic logic includes diagnostic rules for processing diagnostic data from devices associated with a product type.

9. The method of claim 8, wherein the diagnostic rules include removing irrelevant information from the diagnostic data.

10. The method of claim 6, wherein the array is a current array and processing the first diagnostic data object includes:
receiving, from a secondary network device, a first secondary diagnostic data object;
processing, using the device diagnostic logic, the first secondary diagnostic data objects to generate a first secondary filtered data object;
performing the predetermined number of hash functions on the first secondary diagnostic data object to generate a first secondary predetermined number of hash values;
inserting the first secondary diagnostic data object in the current array using the first secondary predetermined number of hash values;
copying the current array to a previous array based at least in part on a time interval lapse; and
copying an empty array to the current array.

11. The method of claim 10, wherein processing second diagnostic data object includes:
receiving, from the secondary network device, a second secondary diagnostic data object;
processing, using the device diagnostic logic, the second secondary diagnostic data objects to generate a second secondary filtered data object;
performing the predetermined number of hash functions on the second secondary diagnostic data object to generate a second secondary predetermined number of hash values;
performing a search in the previous array using the second secondary predetermined number of hash values; and
receiving a false from the search.

12. The method of claim 11, further comprising:
determining that the device state of the secondary network device is changed based at least in part on receiving the false from the search; and
sending, to a remote server, the second secondary filtered data object.

13. The method of claim 6, further comprising:
receiving, from a remote server, an updated device diagnostic logic; and
determining that the device state of the network device is changed based at least in part on receiving the updated device diagnostic logic.

14. The method of claim 13, further comprising:
receiving, from the network device, a third diagnostic data object;
processing the third diagnostic data object using the updated device diagnostic logic to generate a third filtered data object; and
sending, to the remote server, the third filtered data object.

15. One or more non-transitory computer readable media storing computer-executable instructions that, when executed, cause one or more processors to perform operations comprising:
receiving, from a network device, a first diagnostic data object;
processing the first diagnostic data object using a device diagnostic logic to generate a first filtered data object;
determining an array size for Bloom filter arrays based at least in part on a count of managed network devices and a predetermined threshold probability for false positives;

generating the Bloom filter arrays of the array size to store hashed filtered data objects, wherein the Bloom filter arrays includes a previous array and a current array;

performing a predetermined number of hash functions on the first filtered data object to generate a first predetermined number of hash values, wherein the predetermined number of hash functions to perform is based at least in part on the array size and the count of managed network devices;

inserting the first filtered data object in the current array using the first predetermined number of hash values;

receiving, from the network device, a second diagnostic data object;

processing the second diagnostic data object using the device diagnostic logic to generate a second filtered data object;

performing the predetermined number of hash functions on the second filtered data object to generate a second predetermined number of hash values;

performing a search in the previous array using the second predetermined number of hash values; and determining a device state of the network device based at least in part on a result of the search in the previous array.

16. The one or more non-transitory computer readable media of claim 15, the operations further comprising:

determining that the device state of the network device is changed based at least in part on comparing the second filtered data object with respect to the first filtered data object; and sending, to a remote server, the second filtered data object.

17. The one or more non-transitory computer readable media of claim 15, wherein the device diagnostic logic includes diagnostic rules for processing diagnostic data from devices associated with a product type.

18. The one or more non-transitory computer readable media of claim 17, wherein the diagnostic rules include removing irrelevant information from the diagnostic data.

19. The one or more non-transitory computer readable media of claim 15, wherein the the Bloom filter arrays further includes an empty array and processing the first diagnostic data object includes:

copying the current array to the previous array based at least in part on a time interval lapse; and copying the empty array to the current array.

20. The one or more non-transitory computer readable media of claim 15, wherein processing the first diagnostic data object includes:

receiving, from a remote server, an updated device diagnostic logic; and determining that the device state of the network device is changed based at least in part on receiving the updated device diagnostic logic.

* * * * *